US012617335B1

(12) United States Patent
Chen

(10) Patent No.: US 12,617,335 B1
(45) Date of Patent: May 5, 2026

(54) ANGLE-ADJUSTABLE PROJECTION DEVICE FOR VEHICLES

(71) Applicant: Shining Victory International Holdings Co., Limited, Kowloon (HK)

(72) Inventor: Keng-Sheng Chen, New Taipei City (TW)

(73) Assignee: Shining Victory International Holdings Co., Limited, Kowloon (HK)

( * ) Notice: Subject to any disclaimer, the term of this patent is extended or adjusted under 35 U.S.C. 154(b) by 0 days.

(21) Appl. No.: 19/237,375

(22) Filed: Jun. 13, 2025

(51) Int. Cl.
*B60Q 1/26* (2006.01)
*B60Q 1/32* (2006.01)
*F21V 21/30* (2006.01)
*F21S 41/657* (2018.01)

(52) U.S. Cl.
CPC ........... *B60Q 1/2669* (2013.01); *B60Q 1/323* (2013.01); *B60Q 2400/40* (2013.01); *F21S 41/657* (2018.01); *F21V 21/30* (2013.01)

(58) Field of Classification Search
CPC .. B60Q 1/2669; B60Q 1/323; B60Q 2400/40; F21V 21/30
See application file for complete search history.

(56) References Cited

U.S. PATENT DOCUMENTS

| | | | | |
|---|---|---|---|---|
| 6,926,431 | B1 * | 8/2005 | Foote ................... | B60Q 1/2665 |
| | | | | 362/144 |
| 10,155,474 | B2 * | 12/2018 | Salter ...................... | B60Q 1/52 |
| 2019/0283664 | A1 * | 9/2019 | Kang ..................... | B60Q 1/323 |
| 2022/0348134 | A1 * | 11/2022 | Beernaert ............... | B60Q 1/26 |
| 2024/0198895 | A1 * | 6/2024 | Weber ................. | G03B 21/145 |

FOREIGN PATENT DOCUMENTS

| | | | | |
|---|---|---|---|---|
| DE | 102017130246 A1 * | 6/2019 | .......... | B60Q 1/2665 |
| TW | M410844 U | 9/2011 | | |

* cited by examiner

*Primary Examiner* — Alexander K Garlen
(74) *Attorney, Agent, or Firm* — RABIN & BERDO, P.C.

(57) ABSTRACT

Provided is an angle-adjustable projection device for vehicles, including a bracket assembly and a projection lamp assembly. The bracket assembly includes a fixed bracket fixed to the vehicles and a movable bracket fixed to the fixed bracket. The projection lamp assembly is rotatably connected to a cantilever of the movable bracket. The movable bracket is provided with an adjustment screw, the threaded portion of the adjustment screw is screwed into an adjustment screw hole of a housing of the projection lamp assembly. When the adjustment screw is rotated, the projection lamp assembly can be controlled to rotate relative to the cantilever, thereby adjusting the direction and angle of the image projected by the projection lamp assembly.

6 Claims, 5 Drawing Sheets

1

ANGLE-ADJUSTABLE PROJECTION DEVICE FOR VEHICLES

BACKGROUND OF THE INVENTION

1. Field of the Invention

The present invention relates generally to the field of vehicle accessories, and more particularly, to an angle-adjustable projection device for vehicles.

2. The Prior Arts

In order to provide decorative ambient for the vehicle and lighting assistance for getting on and off the vehicle, while enhancing the sense of dignity or luxury, some models of commercial vehicles are equipped with projection lamps. When the projection lamps are activated, patterns or text images can be projected on the ground or at appropriate locations on the vehicle body. For example, a projection lamp can be installed at an appropriate position in the vehicle and connected to the vehicle's power supply. When the vehicle door is opened, the projection lamp is automatically started through sensing to project a pattern or text image onto the ground, thereby highlighting the visual sensory effects and auxiliary lighting at night or in dimly lit environments. The pattern or text may be a car brand's logo, trademark or any pattern and text.

Conventional projection lamps are developed and designed based on different car models and sizes. In other words, projection lamps of specific specifications can only be installed on corresponding car models so that the projected image can obtain accurate focus. In addition, the size, direction and angle of the projected image are fixed and cannot be adjusted according to personal preferences.

SUMMARY OF THE INVENTION

A primary objective of the present invention is to provide an angle-adjustable projection device for vehicles, which allows the user to adjust the direction, angle and size of image projection according to personal preference, in particular a universal projection device that can be installed in various vehicles and can be adjusted in direction.

The present invention provides an angle-adjustable projection device for vehicles, comprising a bracket assembly and a projection lamp assembly; wherein the bracket assembly comprises: a fixed bracket fixed to the vehicle; a movable bracket fixed to a first side surface of the fixed bracket and formed with a pair of cantilevers located on opposite sides, the pair of cantilevers extending to a second side surface of the fixed bracket through a hollow portion of the fixed bracket, and the ends of the pair of cantilevers being respectively provided with shaft sleeves; an adjustment screw rotatably arranged on the movable bracket, and the threaded portion of the adjustment screw extending out of the second side surface of the fixed bracket; a rubber ring sleeved on the adjustment screw and located between the screw head of the adjustment screw and the movable bracket; and a screw buckle arranged on the threaded portion of the adjustment screw; and the projection lamp assembly comprises: a housing provided with a shaft on opposite sides thereof, the shaft being rotatably matched to the shaft sleeve, one side of the housing being provided with an adjustment screw hole, and the adjustment screw hole matching with the adjustment screw; and a lens assembly arranged inside the housing to project an image out of the housing. When the adjustment screw is rotated, the projection lamp assembly can be controlled to rotate relative to the cantilever, thereby adjusting the direction and angle of the image projected by the projection lamp assembly.

In a preferred embodiment, the movable bracket further comprises a plate body, the plate body is formed with a central hole, and a through hole and an arc-shaped slot hole located on opposite sides of the central hole, and the cantilever extends from the plate body; wherein, fixing screws pass through the through hole and the arc-shaped slot hole respectively and are locked into screw holes provided in the fixed bracket. Accordingly, after the projection lamp assembly is installed on the cantilever, the movable bracket can be rotated along the direction of the arc-shaped slot while loosening the fixing screw to adjust the position of the projection lamp assembly, and then the fixing screw is tightened to fix the projection lamp assembly in the adjusted position.

A preferred embodiment of the present invention further comprises: a cap head, formed with a straight slot hole; wherein the adjustment screw passes through the straight slot hole and the center hole, and then is screwed into the adjustment screw hole. Accordingly, when the adjustment screw is loosened, the movable bracket can be moved along the extending direction of the straight slot to adjust the position of the projection lamp assembly, and then the adjustment screw is tightened to fix the projection lamp assembly in the adjusted position.

Preferably, a slot can be formed on the upper side of the cantilever, and the shaft sleeve is arranged in the slot. Accordingly, the shaft sleeve can be easily installed on the cantilever.

In a preferred embodiment, the projection lamp assembly further comprises: a lamp board assembly, disposed in the housing, the lamp board assembly comprising a circuit board and a light-emitting element electrically connected to the circuit board, and the light generated by the light-emitting element projects the image of an image element out of the housing through the lens assembly; and a heat sink, connected to the housing and used to absorb and dissipate the heat generated by the lamp board assembly.

Preferably, a plurality of fins is formed on the outer surface of the heat sink. Accordingly, the heat generated by the lamp board assembly can be effectively and quickly transferred to the fins and then dissipated.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
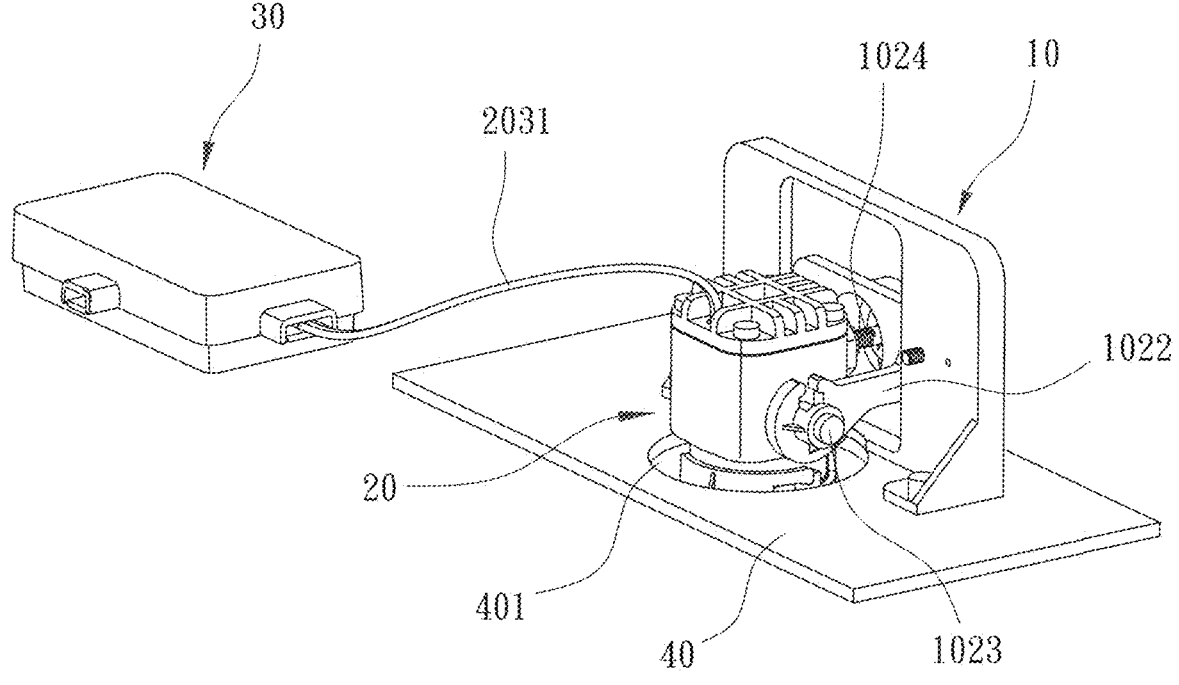
FIG. 1 is a perspective view showing the appearance of a projection device of the present invention after being assembly from a first angle.
Figure 2:
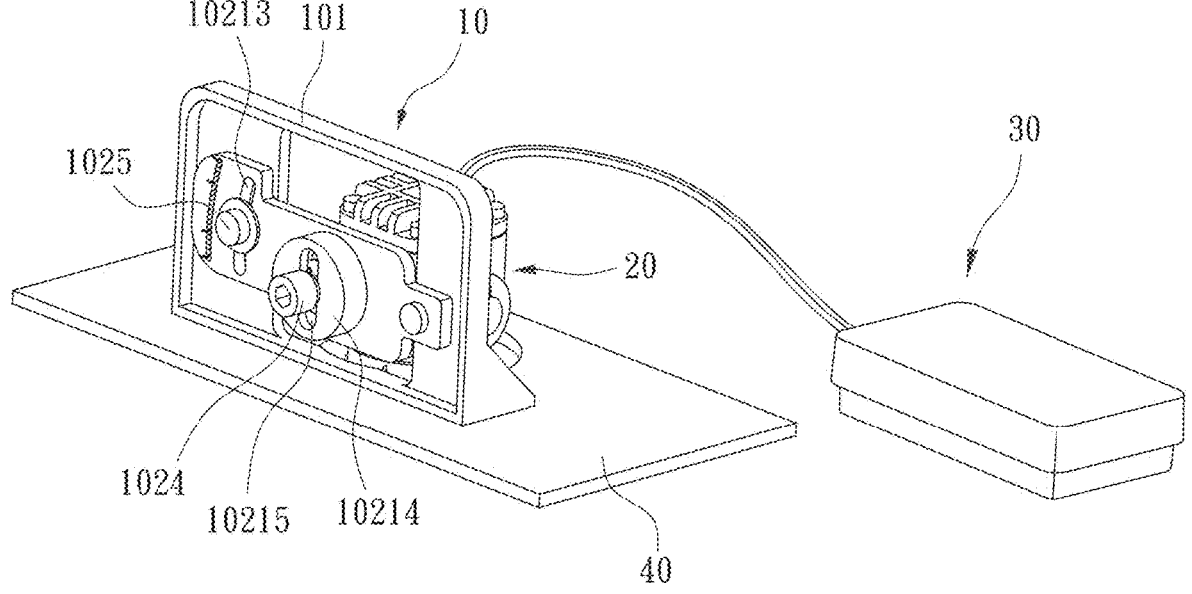
FIG. 2 is a perspective view showing the appearance of the projection device of the present invention after assembly from a second angle.
Figure 3:
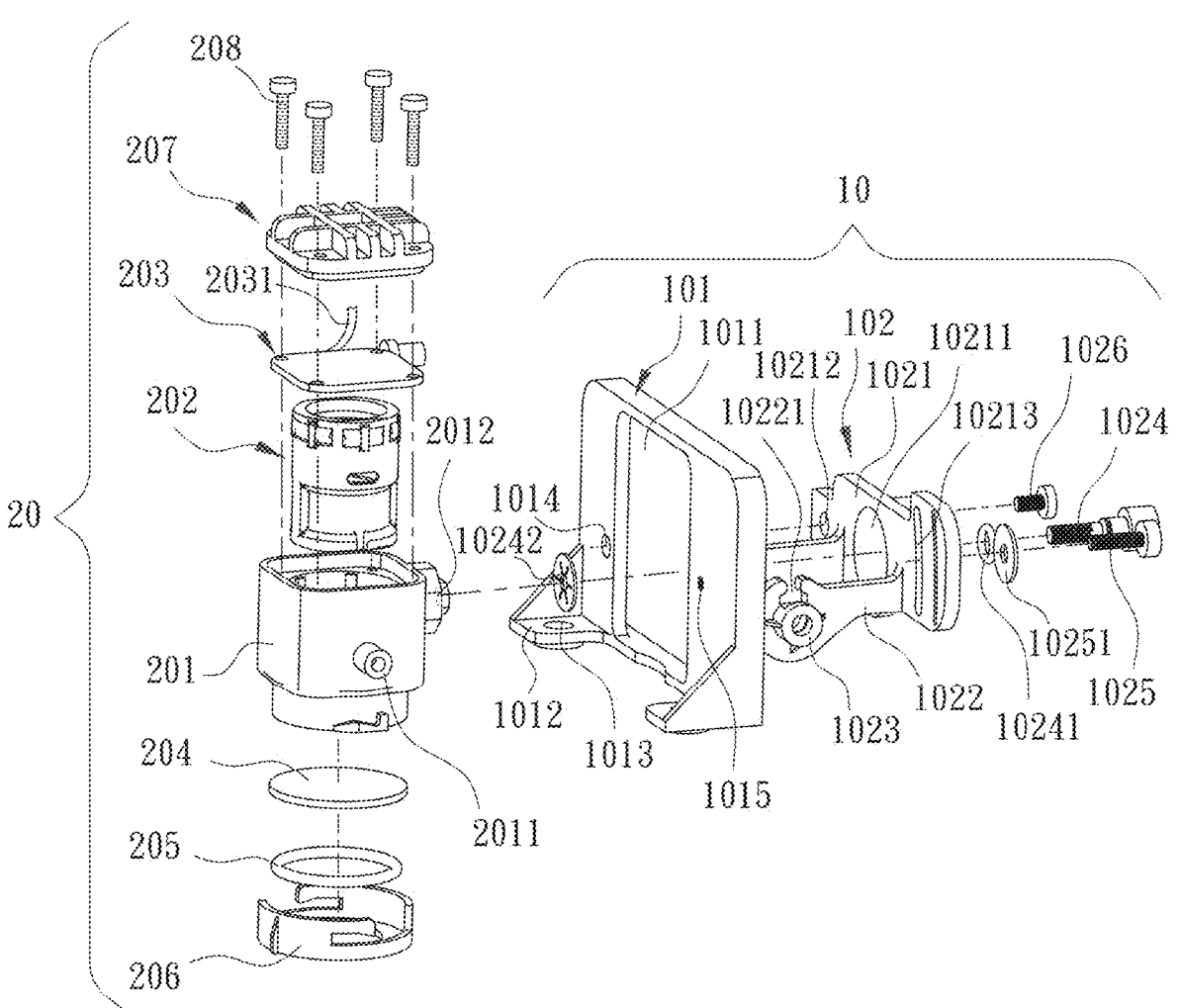
FIG. 3 is a perspective exploded view showing the combination relationship of the main components of the projection device of the present invention.

As shown in FIGS. 1 and 2, the angle-adjustable projection device for vehicles provided by the present invention is applicable to installation at various appropriate locations such as the bottom of a door of a vehicle 40, a rearview mirror, etc., and is electrically connected to a controller 30 via a power cord 2031, and collaborates with the sensor and circuit in the controller 30 to control the automatic projection of an image through a projection port 401 disposed in the vehicle 40 onto the ground when the door is opened, and terminates the image projection when the door is closed. The angle-adjustable projection device for vehicles of the present invention includes a bracket assembly 10 and a projection lamp assembly 20. The bracket assembly 10 further includes a fixed bracket 101 and a movable bracket 102; wherein the fixed bracket 101 is a component fixed to the vehicle 40 (as shown in FIG. 3), the body of the fixed bracket 101 is formed with a hollow portion 1011 penetrating through two opposite side surfaces (i.e., a first side surface and a second side surface), and ears 1012 are formed on opposite sides below the body of the fixed bracket 101. Each ear 1012 is provided with a through hole 1013, that is, the ear 1012 is located at both opposite sides below the second side surface of the fixed bracket 101, and the through holes 1013 are used for screws (not shown) to pass through to fix the fixed bracket 101 to the vehicle 40. In other words, the vehicle 40 shown in FIGS. 1 and 2 indicates a suitable part on the vehicle 40, for example, the bottom of a door, with the bottom of the door provided with screw holes so that the screws pass through the through holes 1013 and are locked into the screw holes at the bottom of the door to fix the fixed bracket 101 to the vehicle 40. Furthermore, screw holes 1014 and 1015 are respectively provided on the opposite sides of the hollow portion 1011 for installing the movable bracket 102, which will be described in detail later.

As shown in FIGS. 1 to 3, the movable bracket 102 has a plate body 1021, the plate body 1021 is formed with a central hole 10211 penetrating two opposite side surfaces (i.e., the first side surface and the second side surface), and a through hole 10212 and an arc-shaped slot 10213 are respectively formed on opposite sides of the central hole 10211. A pair of cantilevers 1022 are horizontally extended on opposite sides of the second side surface of the plate body 1021 (for example, a pair of cantilevers 1022 are fixed to the second side surface of the plate body 1021 by welding), and a slot 10221 is formed on the upper side of each of the cantilevers 1022 close to the free ends, as shown in FIG. 3, wherein the opening of the slot 10221 forms a relatively small width, and the width extending from the opening to the inside forms a relatively large width, so that the sleeve 102 can be arranged in the slot 10221 in an embedded manner; that is, the sleeve 102 can enter the slot 10221 through the opening in a pressed manner to complete the embedding, and the sleeve 102 is used to cooperate with a rotation shaft 2011 provided on the opposite sides of a housing 201 of the projection lamp assembly 20, so that the projection lamp assembly 20 can rotate centered around the rotation shaft 2011.

The movable bracket 102 is used to be fixed to the first side of the fixed bracket 101; specifically, after the cantilever 1022 of the movable bracket 102 passes through the hollow portion 1011 of the fixed bracket 101 and the plate body 1021 is placed against the first side of the fixed bracket 101, the fixing screw 1025 passes through a gasket 10251 and the arc-shaped slot hole 10213 on the plate body 1021 and is locked into the screw hole 1015 of the fixed bracket 101, and the fixing screw 1026 passes through the hole 10212 on the plate body 1021 and is locked into the screw hole 1014 of the fixed bracket 101. After the projection lamp assembly 20 is installed on the cantilever 1022, the movable bracket 102 can be rotated along the direction of the arc-shaped slot 10213 when the fixing screws 1025 and 1026 are loosened to adjust the position of the projection lamp assembly 20 (for example, horizontal or inclined state), and then the fixing screws 1025 and 1026 are tightened to fix the projection lamp assembly 20 in the adjusted position.

Figure 5:
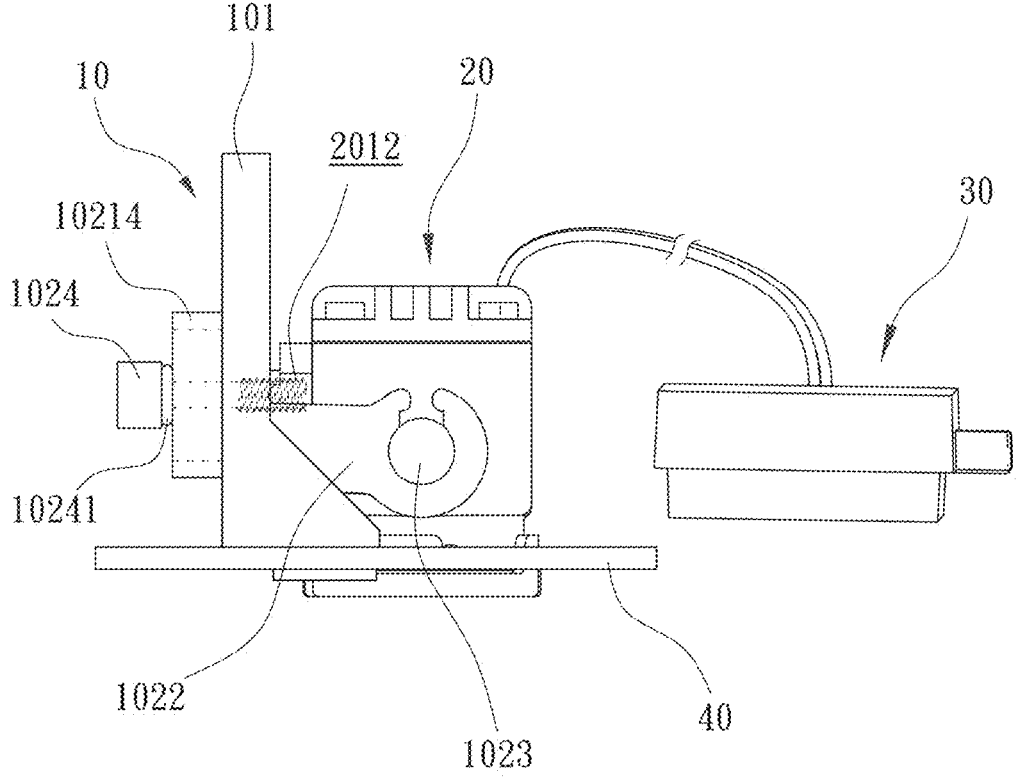
FIG. 5 is a side planar view showing the projection device of the present invention installed on a vehicle.

The bracket assembly 10 of the present invention also includes an adjustment screw 1024, a rubber ring 10241, a screw buckle 10242, and a cap head 10214; wherein, as shown in FIGS. 2 and 5, the cap head 10214 can be formed into a circular or other shaped plate, and a straight slot 10215 is formed thereon; after the adjustment screw 1024 passes through the rubber ring 10241, the straight slot 10215, and the center hole 10211 of the movable bracket 102, the screw buckle 10242 is fitted to the appropriate position of the threaded portion of the adjustment screw 1024 to serve as a blocking element for controlling the stroke of the adjustment screw 1024, and the rubber ring 10241 is located between the screw head of the adjustment screw 1024 and the movable bracket 102. The screw buckle 10242 is shaped like a gasket, and a plurality of radial grooves are formed around the hole in the center to form a plurality of ring-shaped distributed spring sheets. Therefore, when the adjustment screw 1024 passes through the hole of the screw buckle 10242, it can pass through the elastic spring sheet and be stuck at any position of the threaded part, thereby serving as a blocking element for controlling the stroke of the adjustment screw 1024.

As shown in FIG. 2, the projection lamp assembly 20 is connected to the movable bracket 102 and can be rotated relative to the movable bracket 102 to adjust the direction, angle, and size of the projected image. Specifically, the projection lamp assembly 20 includes a housing 201, a lens assembly 202, a lamp board assembly 203, and a heat sink 207; wherein the housing 201 is a hollow shell having a projection hole at one end (not shown, but located at the lower end of the housing 201 shown in FIG. 3), a lens 204 and a sealing ring 205 are arranged at the projection hole, and then a hollow housing lower cover 206 is locked to the housing 201 to fix the lens 204 and the sealing ring 205. The sealing ring 205 is used to prevent water and moisture from entering the housing 201. After the lens assembly 202 and the lamp board assembly 203 are assembled into the housing 201 from the upper end, the heat sink 207 is then covered and fixed to the upper end of the housing 201. A rotation shaft 2011 is provided on two opposite sides of the outside of the housing 201, an adjustment screw hole 2012 is provided on the other side of the outside of the housing 201, and the rotation shaft 2011 is matched with the shaft sleeve 1023 on the cantilever 1022, so that the housing 201 can rotate relative to the cantilever 1022. The adjustment screw hole 2012 and the threaded portion of the adjustment screw 1024 are spirally matched with each other, and when the adjustment screw 1024 rotates into the adjustment screw hole 2012, causing the screw buckle 10242 to abut against the plate body 1021, it can prevent the adjustment screw 1024 from continuing to go deeper.

Figure 4:
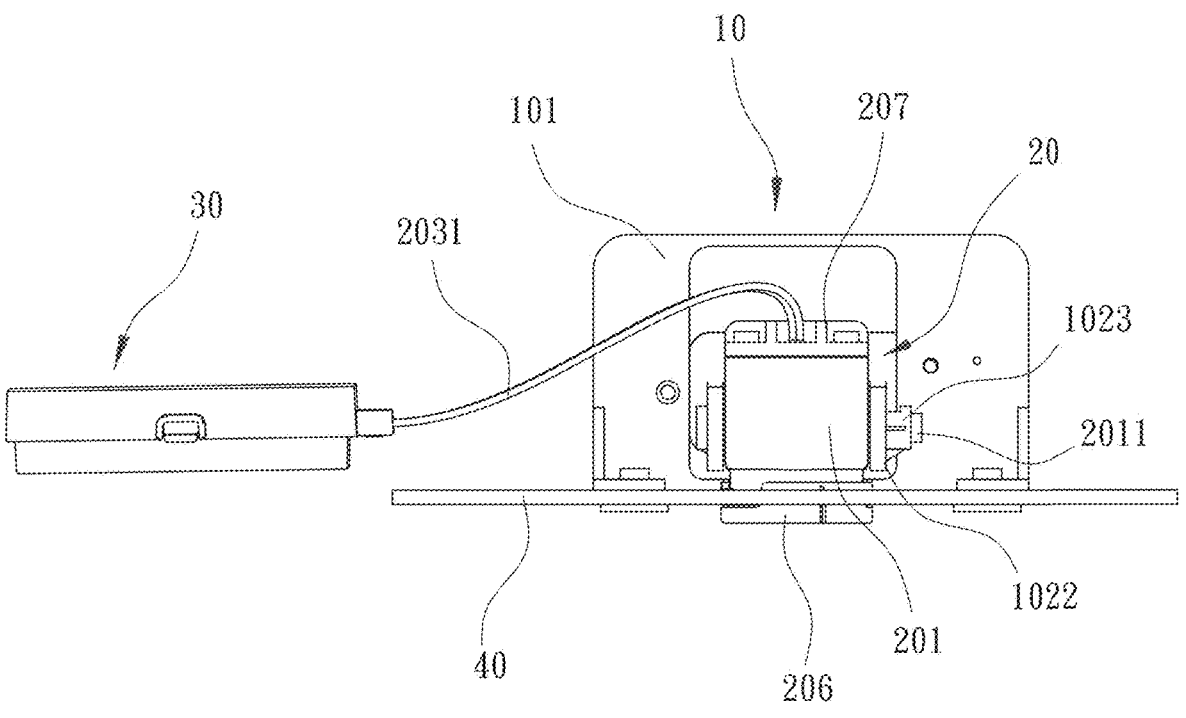
FIG. 4 is a front planar view showing the projection device of the present invention installed on a vehicle.

The lens assembly 202 includes a modularly packaged lens and an image element (not shown). The image element is a film having a pattern, text, etc., and the image element is arranged on the optical path of the lens. The light board assembly 203 includes a circuit board and a light-emitting element, such as an LED (not shown), electrically connected to the circuit board. The circuit board is electrically connected to the vehicle's power supply via a power cord 2031 (as shown in FIG. 4). When powered on, the light-emitting element projects light through the lens assembly 202 to project the image of the image element out of the housing 201. The lens assembly 202 and the light board assembly 203 are both conventional techniques and are not technical features claimed in the present application, so further detailed description is omitted.

The heat sink 207 is formed to have a plurality of fins on its outer surface and is provided with perforations at four corners. When the lens assembly 202 and the light board assembly 203 are both installed in the housing 201 and the heat sink 207 is covered on the housing 201, a fixing screw 208 is passed through the perforation and then locked into the screw hole of the housing 201 to fix the heat sink 207 to the housing 201. The heat generated when the light-emitting element of the light board assembly 203 emits light can be transferred to the heat sink 207 and dissipated by the plurality of fins formed thereon.

As shown in FIG. 5, after the projection device for vehicles of the present invention is installed on the vehicle 40, the direction, angle and image size of the image projected by the projection lamp assembly 20 can be adjusted by operating the adjustment screw 1024. Specifically, for example, when the adjustment screw 1024 is rotated counterclockwise, the adjustment screw 1024 will pull the projection lamp assembly 20 to move in a direction close to the adjustment screw 1024. On the other hand, when the adjustment screw 1024 is rotated clockwise, the adjustment screw 1024 will push the projection lamp assembly 20 to move away from the adjustment screw 1024, thereby adjusting the direction and angle of the projection of the projection lamp assembly 20. In the process of rotating the adjustment screw 1024, a slight pressing effect is generated by the screw head of the adjustment screw 1024 squeezing the elastic rubber ring 10241 or rebounding after relaxing, thereby slightly adjusting the movement angle of the projection lamp assembly 20. By adjusting the direction and angle of the projection lamp assembly 20, the size of the projected image can be adjusted at the same time. That is, when the projected image is perpendicular to the ground, the image is smallest. When the angle between the output light of the projection lamp assembly and the ground is smaller (that is, the angle with the vertical line is larger), the image projected on the ground becomes larger. Therefore, the angle-adjustable projection device for vehicles of the present invention is suitable for installation in any type of vehicle, and provides convenient adjustment of the direction, angle, and size of the projected image.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An angle-adjustable projection device for vehicles, comprising:
    a bracket assembly comprising:
        a fixed bracket fixed to the vehicle;
        a movable bracket fixed to a first side surface of the fixed bracket and formed with a pair of cantilevers located on opposite sides, the pair of cantilevers extending to a second side surface of the fixed bracket through a hollow portion of the fixed bracket, and the ends of the pair of cantilevers being respectively provided with shaft sleeves;
        an adjustment screw rotatably arranged on the movable bracket, and the threaded portion of the adjustment screw extending out of the second side surface of the fixed bracket;
        a rubber ring sleeved on the adjustment screw and located between the screw head of the adjustment screw and the movable bracket; and
        a screw buckle arranged on the threaded portion of the adjustment screw; and
    a projection lamp assembly comprising:
        a housing provided with a shaft on opposite sides thereof, the shaft being rotatably matched to the shaft sleeve, one side of the housing being provided with an adjustment screw hole, and the adjustment screw hole matching with the adjustment screw; and
        a lens assembly arranged inside the housing to project an image out of the housing.

2. The angle-adjustable projection device for the vehicles according to claim 1, wherein the movable bracket comprises a plate body, the plate body is formed with a central hole, and a through hole and an arc-shaped slot hole located on opposite sides of the central hole, and the cantilever extends from the plate body;
    wherein, fixing screws pass through the through hole and the arc-shaped slot hole respectively and are locked into screw holes provided in the fixed bracket.

3. The angle-adjustable projection device for the vehicles according to claim 2, further comprising: a cap head formed with a straight slot hole;
    wherein the adjustment screw passes through the straight slot hole and the center hole, and then is screwed into the adjustment screw hole.

4. The angle-adjustable projection device for the vehicles according to claim 3, wherein a slot is formed on an upper side of the cantilever, and the shaft sleeve is arranged in the slot.

5. The angle-adjustable projection device for the vehicles according to claim 1, wherein the projection lamp assembly further comprises:
    a lamp board assembly disposed in the housing, the lamp board assembly comprising a circuit board and a light-emitting element electrically connected to the circuit board, and light generated by the light-emitting element projects the image of an image element out of the housing through the lens assembly; and
    a heat sink connected to the housing and used to absorb and dissipate heat generated by the lamp board assembly.

6. The angle-adjustable projection device for the vehicles according to claim 5, wherein a plurality of fins is formed on an outer surface of the heat sink.

* * * * *